(Specimens.)

W. C. ABBOTT.
MANUFACTURE OF BUTTONS AND OTHER ARTICLES FROM PLASTIC MATERIALS.

No. 300,934. Patented June 24, 1884.

WITNESSES:
E. B. Bolton
Geo. Quinton

INVENTOR:
Wilbur C. Abbott
By his Attorneys,
Burke, Fraser & Connett

UNITED STATES PATENT OFFICE.

WILBUR C. ABBOTT, OF BABYLON, NEW YORK.

MANUFACTURE OF BUTTONS AND OTHER ARTICLES FROM PLASTIC MATERIALS.

SPECIFICATION forming part of Letters Patent No. 300,934, dated June 24, 1884.

Application filed March 17, 1884. (Specimens.)

*To all whom it may concern:*

Be it known that I, WILBUR C. ABBOTT, a citizen of the United States, residing in Babylon, Suffolk county, (Long Island,) New York, have invented certain Improvements in the Manufacture of Buttons and other Articles from Plastic Materials, of which the following is a specification.

My invention relates to a means and mode of ornamenting buttons and other similar articles made from ground horn and hoof and from other similar materials capable of being solidified by heat or pressure, or both. My object is to ornament the face or surface of the article with lines similar to fine engraving, arranged to form a design, the design being, of course, formed of raised lines. My method enables me to accomplish this at very little expense. Indeed articles may be ornamented in this way in a great variety of designs at a trifling advance on the cost of unornamented articles, and the ornamentation is extremely fine and delicate. The method and means I employ will be best explained in connection with the accompanying drawings, wherein—

Figure 2:
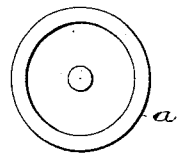
Figure 1:
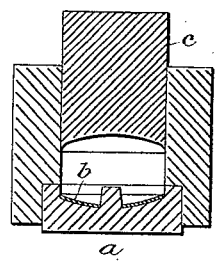
Figure 3:
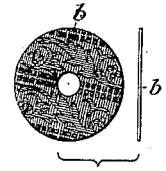
Figure 4:
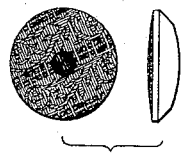
Figure 5:
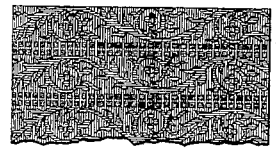

Figure 1 is a vertical mid-section of an ordinary die or mold such as is employed for making buttons from ground horn or hoof. Fig. 2 is a plan of the bottom section or plate of the die. Fig. 3 is a face and edge view of the disk, of thin ornamental metal plate, which I employ in effecting the ornamentation. Fig. 4 is a face and edge view of a button with its face ornamented by my means and method; and Fig. 5 is a face view of a piece or sheet of the thin ornamented metal from which are cut the disks, shown in Fig. 3.

In proceeding to carry out my invention I employ the ordinary die or mold shown in Fig. 1, or any other of a similar character, and use or may use for the bottom section, $a$, Fig. 2, a plate made perfectly smooth inside, such as are used for making buttons with smooth faces. Such a section is easily made by turning in a lathe and polishing. I cut from a sheet of thin metal having a surface ornamented in relief or intaglio—such as is shown in Fig. 5—a disk, $b$, as shown in Fig. 3, which is of the proper size and shape to fit into $a$, and place it therein with the ornamented side up. The plastic material from which the button is to be made is now placed in the die on disk $b$, and the plunger $c$ forced down upon the material with the required pressure. If ground horn or hoof be employed, the die and its contents are submitted to heat and pressure simultaneously in the usual way. The pressure forces the flat disk down into the concavity of the plate $a$. (See Fig. 1.) If the button is designed to have a convex face, the plate $a$ is so formed as to produce it, and the plastic material is pressed into all the lines of the design on the face of disk $b$. When the button is removed from the die, it will be found to have received on its face an exact negative of the design on the disk.

The thin metal plate shown in Fig. 4 is a common article of trade, and may be purchased by any one. It is usually of thin copper, with a thin plating on the face of gold or silver, or both. It is designed for the manufacture of fancy articles, and is ornamented, I believe, by being rolled between finely-engraved steel rolls. In order to use it, it is only necessary to cut the disks therefrom and insert them in the dies. Each disk will serve for ornamenting a great many articles, and when worn or defaced it may be readily removed and a fresh one inserted.

The advantages of my method of ornamenting will be obvious. The engraving of the steel face plate or section $a$ of the die would be very difficult to do and very expensive, and it would be impracticable to engrave on its recessed face as fine, regular, and intricate a design as can be obtained by my method. Moreover, as the ornamented metal I employ can be had of a great variety of designs, I am enabled to make not only plain-faced articles, but articles having on their faces a variety of designs, with one die.

As the ornamented metal of the disk $b$ is thin and flexible and readily conforms to the general form of the face of section $a$, I may make the said face plane, concave, convex, or wavy. In the drawings the section $a$ is designed to produce a button with a convex face.

Buttons and similar articles are usually made with their faces down or next the bottom section, $a$; but sometimes they are made with their faces up or next the plunger $c$. In that case the material to form the article would be first placed in the die, and the disk *b* placed on top of the same with its face down. This method is best adapted to buttons with shanks or eyes. The thin ornamented metal will of course be properly placed in all cases to effect the desired result. If both sides or faces of the article are to be ornamented, two disks or sheets would be required. I have described the metal from which the disks *b* are made as being plated with silver or gold, and this is so of the metal sold in the market; but this is not essential so far as my method is concerned. I may make this metal especially for my use, and it is only essential that it shall have engraved or impressed on it the proper design.

It should be particularly observed that according to my invention the ornamentation in relief is impressed in or upon the face of the button or other molded article, and that the engraved or ornamented plate from which this impression is obtained is separated from the button, forming in fact a part of the die and no part of the button. It is thus that my invention is distinguished from those methods whereby molded articles are ornamented by placing an ornament in the die with the plastic substance, which, during the pressure, becomes connected to or incorporated with the plastic material, and is removed from the die with the molded article as an inseparable part thereof.

Having thus described my invention, I claim—

The improved method of making molded articles from plastic materials with a face ornamented in relief or intaglio, which consists in placing in the die, together with the plastic material, and against the face of the die, a thin plate or disk having on its surface, in contact with said plastic material, a design in relief or intaglio, then subjecting the die to pressure, and finally separating the molded article from the die and from said plate, substantially as set forth, whereby the face of the article is impressed with the reverse of the design on said plate.

In witness whereof I have hereunto signed my name in the presence of two subscribing witnesses.

WILBUR C. ABBOTT.

Witnesses:
HENRY CONNETT,
ARTHUR C. FRASER.